(No Model.)  2 Sheets—Sheet 1.

W. HASLUP.
WHEELED EARTH SCRAPER.

No. 541,047. Patented June 11, 1895.

Witnesses:
Jos. H. Blackwood
Albert B. Blackwood.

Inventor.
William Haslup
By Wm. Hunter Meyer
Attorney.

THE NORRIS PETERS CO., PHOTO-LITHO., WASHINGTON, D. C.

(No Model.) 2 Sheets—Sheet 2.

W. HASLUP.
WHEELED EARTH SCRAPER.

No. 541,047. Patented June 11, 1895.

Witnesses:
Jos. H. Blackwood
Albert B. Blackwood

Inventor.
William Haslup,
By Wm. Hunter Myers,
Attorney.

UNITED STATES PATENT OFFICE.

WILLIAM HASLUP, OF SIDNEY, ASSIGNOR OF ONE-HALF TO J. H. DOEHRING, OF WAPAKONETA, OHIO.

WHEELED EARTH-SCRAPER.

SPECIFICATION forming part of Letters Patent No. 541,047, dated June 11, 1895.

Application filed December 15, 1894. Serial No. 531,940. (No model.)

*To all whom it may concern:*

Be it known that I, WILLIAM HASLUP, a citizen of the United States, residing at Sidney, in the county of Shelby and State of Ohio, have invented certain new and useful Improvements in Wheeled Earth-Scrapers, of which the following is a specification, reference being had therein to the accompanying drawings.

My invention, which relates to wheeled earth-scrapers, has for one of its objects to provide improved means for preventing the scraper-bowl from tipping forward in the act of loading, the peculiarity of this improvement residing in a pivoted catch on the bowl adapted to engage with a hook fixed on the draft-bar, the pivotal relation of the catch to the hook being such as to permit a variable movement of the former to enable the front of the bowl to take deeper in the plowed ground, as is desirable while the bowl is passing over hard clods, stones, &c.

Heretofore, as far as I am aware, the hook and the catch for preventing tipping of the bowl have always been so constructed and arranged as to permit of no variation of the point of connection when in operative relation to each other, and therefore when the bowl was lowered so as to bring the hook and catch together it was incapable of further depression.

Another object of my invention is to improve the construction of the connections between the tongue and the bowl, whereby the torsional strain usually exerted on the draft-bars at points between the bowl and tongue is materially lessened, such strain being at its maximum when the line of direction of the moving scraper is changed during the operation of loading. To change the direction of movement of the scraper while loading subjects the forward ends of the draft-bars to immense strain, and often results in bending or twisting them and sometimes in wrenching them from their fastenings to the tongue. By my invention I have reduced the strain on these parts to the minimum, transferring the greater portion of it to parts least affected thereby.

The invention will first be described in connection with the accompanying drawings, and then pointed out in the claims.

Figure 1:
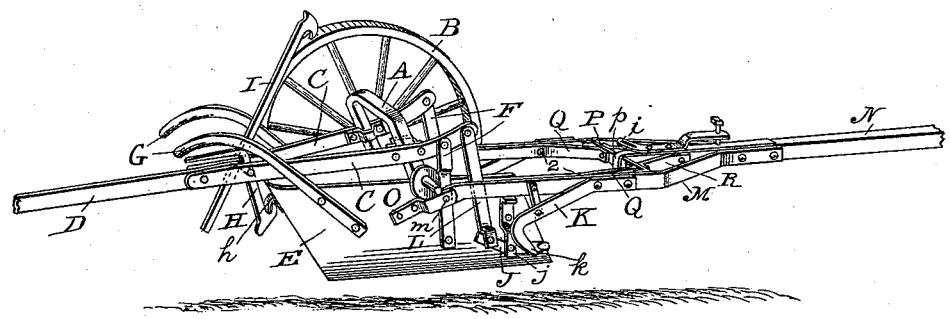
Figure 2:
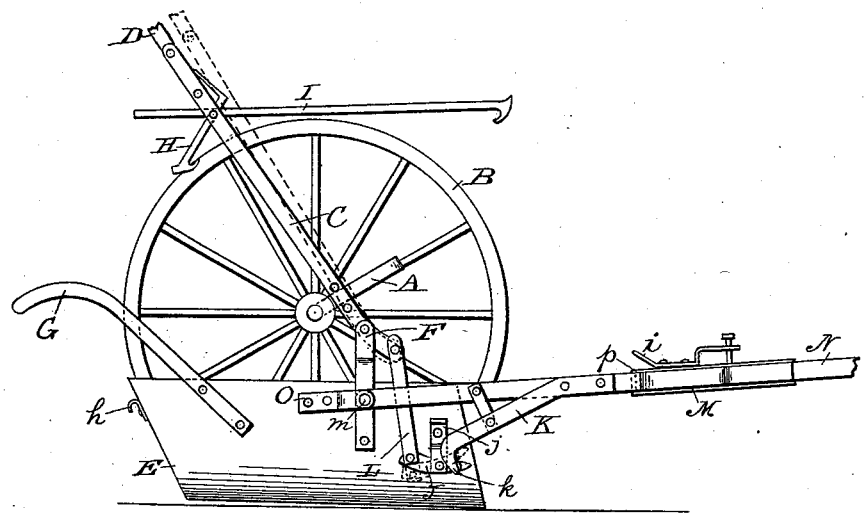
Figure 3:
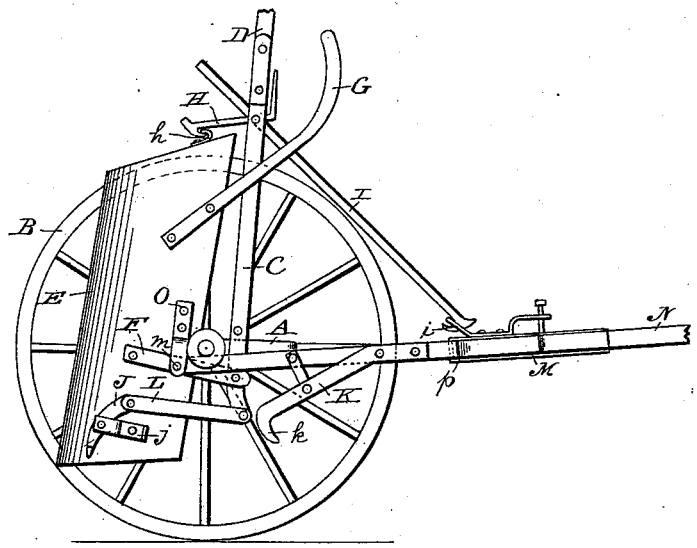
Figure 4:
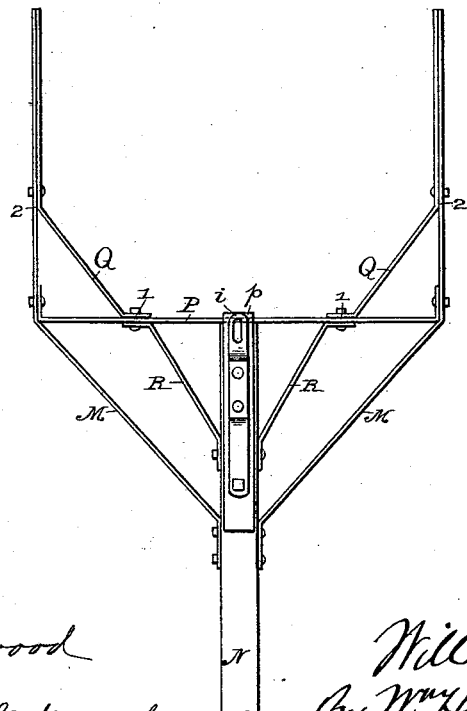

Figure 1 of the drawings is a perspective view of a wheeled scraper constructed in accordance with my invention, with the near wheel removed, the bowl being shown in the elevated position. Fig. 2 is a side elevation with the near wheel removed, showing the bowl and other parts in position for loading. Fig. 3 is a similar view of the scraper, showing it in a position to dump the load. Fig. 4 is a plan view illustrating my invention relating to the draft-bars.

In the drawings, A is an arched axle; B, the wheels mounted on the axle; C, the lever-bars rigidly secured to the axle; D, the lever rigidly fixed to said bars; E, the bowl; F, standards, to whose upper ends the lever-bars are pivoted, said standards being rigidly secured at their lower ends to the bowl; G, the handles secured to the bowl; H, a latch, pivoted between the lever-bars and adapted to engage with any suitable projection, as *h*, on the rear end of the bowl; and I a hook-rod, pivoted to one of the lever-bars and adapted to engage with the strap *i* secured on the tongue. As all these parts are of common construction no specific description thereof is necessary.

The first feature of novelty in my invention consists of the mechanism employed by me for preventing the tipping of the bowl in the act of loading, which mechanism I will now describe with relation to one side of the scraper only, it being understood that such mechanism is duplicated on the other side.

J is an angular catch pivoted to one side of the bowl, it being held thereto by a metallic strap *j*, which, when the bowl is elevated, rests under the draft-bar, as seen in Fig. 1, and prevents backward tipping of the bowl.

K is a bar rigidly bolted at one end to the draft-bar, and having a hook *k* formed on its free end, the face of this hook being formed substantially straight, as seen in the different views.

L is a link pivotally connecting catch J with the forward end of one of the lever-bars C. The catch J has such pivotal relation to the hook *k* as to be slightly out of contact with the hook when the bowl is elevated, as shown in Fig. 1, and to come into contact with it below the bend of the hook when the bowl is lowered for loading, as seen in full lines in Fig. 2. This latter will be the ordinary relation of the two parts; but it sometimes becomes necessary to still further depress the bowl, as when the latter is passing over hard clods, which could not be done if there were but a single point of contact between the catch and hook. Now when is desired to give this additional depression to the bowl the operator can do so by turning the axle A slightly farther forward, when the parts will assume the positions indicated in dotted lines in Fig. 2, wherein it will be seen that catch J has moved up into the bend of hook $k$, in which position, as well as in the position last above described, it and the hook serve to prevent the bowl from tipping forward, and also to assume a portion of the draft-strain.

The next feature of my invention pertains to strengthening the draft-bars M, each of which latter is bolted at its forward end to the tongue N and is pivoted at its rear end on a bolt $m$, passed through standard F and through one side of the bowl, an ordinary holdback strap O, passed over the bolt $m$ outside of the draft-bar and secured to the bowl, to counteract strain on the bolt, being employed.

My improvement in respect to the draft-bars consists primarily in the employment of a transverse brace P, joining said bars at the angle formed in connecting them to the tongue, this brace being continuous from one bar to the other, bolted to each, and held to the rear end of the tongue by a metal strap $p$, looped over the brace and secured to the upper and lower sides of the tongue.

I am aware that heretofore the rear end of the tongue has been braced by separate braces extending from each draft-bar to the sides of the tongue and secured thereto; but such is not my construction nor my purpose, for I have in view the strengthening of the draft-bars, and this is done by the employment of a single brace extending from one draft-bar to the other and joining them at the angle or bend made to carry them inward to the tongue, the central portion of the brace abutting against the rear end of the tongue and being secured thereto by the strap $p$ aforesaid.

By the employment of the brace P above described I may also, if desired, construct the draft-bars of much lighter material than usual, and this I am enabled to do by running a diagonal brace Q from the brace P, as at 1, to the draft-bar at 2, which is at or near the front end of the bowl, and extending said diagonal brace rearward parallel with the bar throughout its length, and then running braces R from the tongue to the brace P, each of the braces Q and R being secured to the brace P by the same bolt.

Having thus described my invention, what I claim as new, and desire to secure by Letters Patent, is—

1. In a wheeled scraper, a bar rigidly secured to the draft-bar and having a hook formed on its free end, a catch pivoted to the bowl, and a link pivotally connecting the catch with the forward end of the lever-bar, the whole being so arranged that the catch will engage with the hook when the bowl is lowered to the loading position.

2. In a wheeled scraper, a bar rigidly secured to the draft-bar and having a hook formed on its free end, said hook having a substantially straight face, a catch pivoted to the bowl, and a link pivotally connecting the catch with the forward end of the lever-bar, the whole being so arranged that the catch will engage with the hook at variable points and be capable of swinging clear of the hook.

3. In a wheeled scraper, the combination, with the tongue, of draft-bars secured at one end to the tongue, a transverse brace connecting the draft-bars at the angles formed in bending the latter inward to the tongue, a strap passed over said brace for securing it to the end of the tongue, diagonal braces extending from the transverse brace to the draft-bars at a point slightly forward of the bowl and extending thence rearward parallel with said bars throughout their length, and braces extending from the tongue to the transverse brace.

In testimony whereof I affix my signature in presence of two witnesses.

WILLIAM HASLUP.

Witnesses:
D. OLDHAM,
GEO. B. STERLINE.